United States Patent

Ochiai et al.

[11] Patent Number: 6,107,698
[45] Date of Patent: Aug. 22, 2000

[54] POWER SUPPLY CIRCUIT FOR ELECTRIC DEVICES

[75] Inventors: Masashi Ochiai; Tsuyoshi Kochi; Soji Senoo, all of Saitama-ken, Japan

[73] Assignee: Kabushiki Kaisha Toshiba, Kawasaki, Japan

[21] Appl. No.: 09/395,736

[22] Filed: Sep. 14, 1999

[30] Foreign Application Priority Data

Sep. 14, 1998 [JP] Japan .................................. 10-260522

[51] Int. Cl.[7] ...................................................... H02J 1/00
[52] U.S. Cl. ............................... 307/43; 307/64; 307/80
[58] Field of Search .................................. 307/43, 64, 80;
348/730; 362/109

[56] References Cited

U.S. PATENT DOCUMENTS

| 5,414,475 | 5/1995 | Trzyna et al. | 348/730 |
|---|---|---|---|
| 5,564,814 | 10/1996 | Anderson | 362/109 |
| 5,686,767 | 11/1997 | Heifrich et al. | 307/64 |

FOREIGN PATENT DOCUMENTS

| 10-224988 | 8/1998 | Japan . |
|---|---|---|
| 10-295043 | 11/1998 | Japan . |

*Primary Examiner*—Stephen W. Jackson
*Assistant Examiner*—Sharon Polk
*Attorney, Agent, or Firm*—Pillsbury Madison & Sutro LLP

[57] ABSTRACT

When the power key on the remote controller 12 is pressed, the electromagnetic wave is sent from the remote controller 12 to the main unit 100 of the electric device and the switch circuit 23 or 43 as the first switching means is turned on. Upon turning on of the first switching means by the power key operation, the power starts to be supplied from the second power supply 22 or 41 serving as the stand-by power supply circuit to the load circuit required for stand-by operation such as the microcomputer 24 and the light receiver 10. After that, corresponding to the first infrared signal sent from the remote controller 12, the relay 3 as the second switching means is turned on so that the commercial AC power source 1 is supplied to the main power supply circuit 2 in the main unit 100 of the electric device and the load circuit for the ordinary operation in the main unit 100 (main circuit of the device) start operation. The power is supplied from the second power supply 22 or 41 serving as the stand-by power supply circuit to the load circuit required for stand-by operation only for a short period from the start of the stand-by status after the power key operation to the ordinary operation status, and the power supply amount for the second power supply 22 or 41 serving as the stand-by power supply circuit can be only a little. When any power supply other than the commercial AC power source 1 such as a solar battery 221 is used as the second power supply, the stand-by power of the electric device in stand-by status can be reduced to zero.

7 Claims, 6 Drawing Sheets

POWER SUPPLY CIRCUIT FOR ELECTRIC DEVICES

BACKGROUND OF THE INVENTION

1. Field of the Invention

The present invention relates to a power supply circuit for electric devices provided with a stand-by power supply circuit and a main power supply circuit in an electric device, in which the stand-by power supply circuit and the main power supply circuit can be controlled based on the remote controller operation so that the power consumption of the electric device during stand-by status can be reduced approximately to zero.

2. Description of the Related Art

Some conventional electric devices such as TV sets are designed to supply the power fed from the commercial AC power source to the stand-by power supply circuit and, at the same time, to the main power supply circuit via the stand-by switch. Such an electric device usually supplies the power to the stand-by power supply circuit to make at least the control means operable so that it can be controlled by the remote controller (stand-by status). To actually operate the main circuit of the device, the user operates the power key on the remote controller to turn on the stand-by switch, which turns on the main power supply circuit to lead the above main circuit to the operation status.

Figure 6:
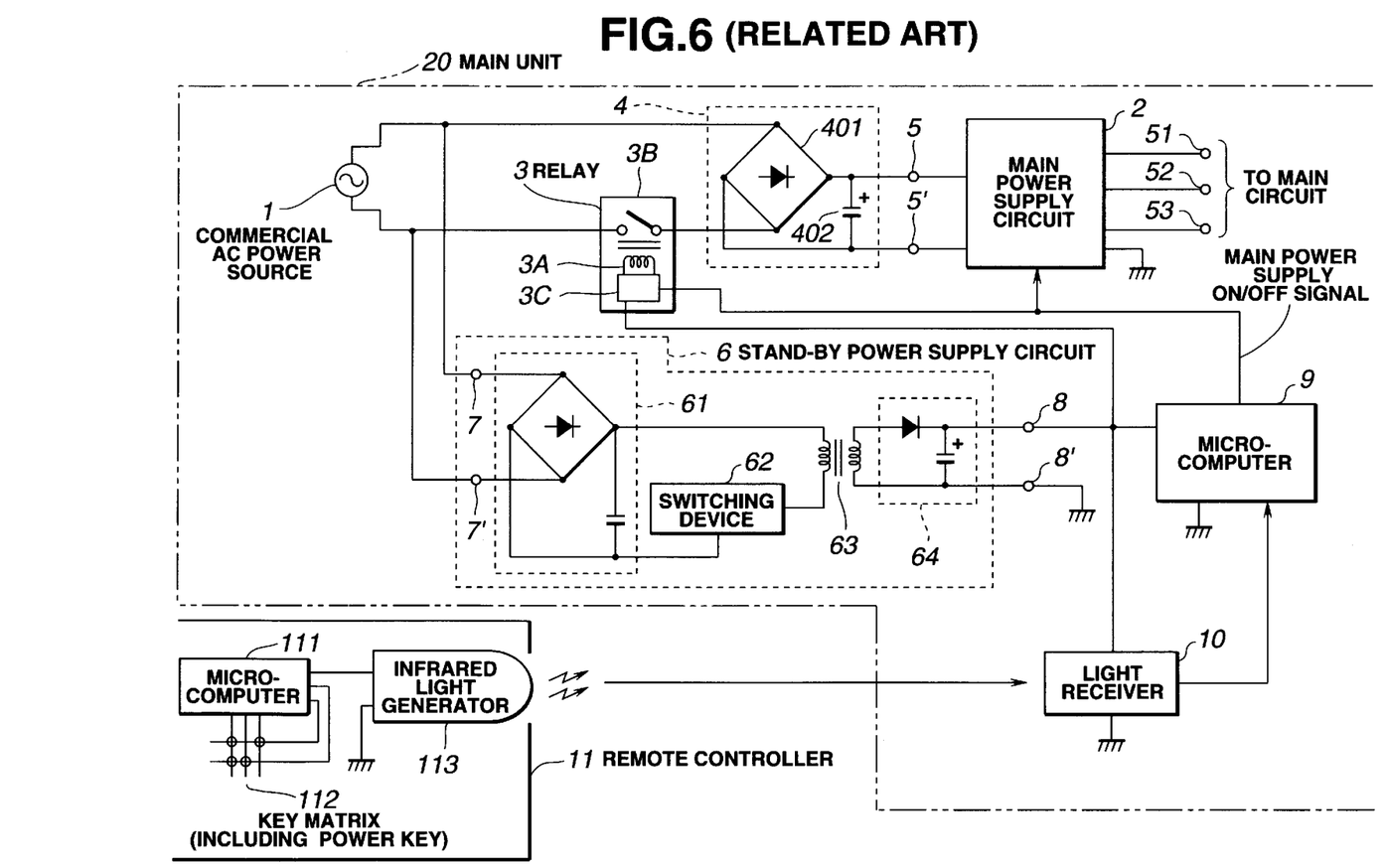
FIG. 6 is a block diagram showing a power supply circuit of the electric device according to a conventional example.

FIG. 6 shows the configuration of a power supply circuit used in a conventional electric device.

In FIG. 6, commercial AC power source 1 is connected via a relay 3 to a rectifier smoothing circuit 4 and further connected to input terminals 5 and 5' of a main power supply circuit 2 which operates various load circuits (main circuit) of a main unit 20. The relay 3 consists of a drive winding 3A, a relay switch 3B and a drive circuit 3C. The rectifier smoothing circuit 4 has a full-wave rectifier circuit 401 and a smoothing capacitor 402. The main power supply circuit 2 comprises, for example, a switching type regulated power supply circuit. With the relay 3 turned on at the time of the activation of the device, the DC voltage from the rectifier smoothing circuit 4 is supplied to the main power supply circuit 2 and the main power supply circuit 2 generates various sizes of regulated DC voltage, so that the generated DC voltage is supplied from output terminals 51, 52 and 53 to various load circuits (main circuit) not shown.

The commercial AC power source 1 is also connected to input terminals 7 and 7' on the primary side of a stand-by power supply circuit 6. Connected to output terminals 8 and 8' on the secondary side of the stand-by power supply circuit 6 are the load circuits required for stand-by operation, which are a microcomputer 9 for control, a light receiver 10 for the remote control signal and the drive circuit 3C of the relay 3. The load power is supplied to these sections in the stand-by and ordinary operations. The above stand-by power supply circuit 6 comprises, for example, a switching type power supply circuit having a rectifier smoothing circuit 61, a switching device 62, a converter transformer 63 for voltage conversion and a rectifier circuit 64 on the secondary side of the transformer.

To the light receiver 10, the infrared remote control signal is input from a remote controller 11. The remote controller 11 comprises a microcomputer 111 for control, a key matrix 112 including a power key and an infrared light generator 113 and is designed so that, when a certain key is pressed, the infrared code signal corresponding to the key is transmitted.

In the power supply circuit having the configuration above, the stand-by status can be switched to the ordinary operation status as described below. When the user presses the power key on the remote controller 11, the remote controller 11 transmits the infrared code signal to the light receiver 10 of the main unit 20 and, this code signal is transmitted to the microcomputer 9 of the main unit 20, and then the microcomputer 9 transmits the main power supply ON/OFF signal to the drive circuit 3C of the relay 3. Alternatively, in the circuit configuration without a relay 3, the main power supply ON/OFF signal is transmitted to the main power supply circuit 2 for switching to the operation status.

Conventionally, the electric device in stand-by status needs to always have the power supplied to the load circuits (such as the microcomputer 9 and the light receiver 10) required for stand-by operation because it receives the infrared signal transmitted from the remote controller 11 and operates the main power supply circuit 2 of the main unit 20. The required power is supplied from the commercial AC power source 1 via the stand-by power supply circuit 6. The device in the stand-by status consumes the power though the consumption level is quite lower than that in the ordinary operation status. Even while the user does not actually use the device, the device keeps on consuming the power. The power consumption in a year would be increased due to such consumption.

As described above, the conventional power supply circuit uses the commercial AC power source as the power source for the stand-by power supply circuit and, in the stand-by status, its power consumption from the commercial AC power source is increased.

SUMMARY OF THE INVENTION

It is an object of the present invention to provide a power supply circuit for an electric device which can save the power consumption at the stand-by power supply circuit.

It is another object of the present invention to provide a power supply circuit for an electric device which can reduce the power consumption of the electric device in stand-by status to zero substantially.

According to a first invention to achieve the above objects, in a power supply circuit for an electric device having a main power supply circuit and a stand-by power supply circuit in the main unit of said electric device which can control turning on and off of said main power supply circuit according to the key operation on the remote controller, said remote controller comprises operation keys; means for generating an electromagnetic wave and transmitting it to said main unit; means for generating a remote control signal containing a first signal to turn on said main power supply circuit and transmitting it to the main unit; and first control means for providing instruction for the emission of said electromagnetic wave corresponding to the operation of a certain key among said operation keys and providing instruction for the transmission of said first signal after the emission of said electromagnetic wave; and said main unit comprises a main power supply circuit for supplying the power to a first load circuit required for ordinary operation during ordinary operation based on the commercial AC power source; receiving means for receiving said remote control signal from said remote controller; second control means to which the remote control signal received by said receiving means is supplied and which controls the main unit in response to the remote control signal; a first power supply for receiving the electromagnetic wave from said remote controller, converting the received electromagnetic wave to the electric energy and generating the DC voltage; a second power supply serving as a stand-by power supply circuit for supplying the power to a second load circuit (including at least said second control means and said receiving means) required for stand-by operation during stand-by status; a first switching means provided between said second power supply and said second load circuit to turn on and off the connection between said second power supply and said second load circuit corresponding to whether or not the DC voltage is received from said first power supply; and a second switching means for turning on and off the power supply from said commercial AC power source to said main power supply circuit which, under the control by said second control means, makes switch operations corresponding to the remote control signal received by said receiving means.

In the first invention, when a certain key (e.g., the power key) on the remote controller is pressed, the electromagnetic wave is sent from the remote controller to the main unit and the first switching means is turned on. Upon turning on of the first switching means by the certain key operation, the power starts to be supplied from the second power supply serving as the stand-by power supply circuit to the second load circuit required for stand-by operation (the second control means and the receiving means in the main unit). After that, corresponding to the first signal transmitted from the remote controller, the second switching means is turned on so that the power is supplied from the commercial AC power source to the main power supply circuit in the main unit and the first load circuit for the ordinary operation (the second control means and the receiving means in the main unit and main circuits in the main unit) start operation. Corresponding to the power key operation, the main unit proceeds to the ordinary operation after quite a short period of stand-by status. By supplying the power required for stand-by operation to the second load circuit required for stand-by operation only during such period until proceeding to the ordinary operation, the power supply (or the power consumption) at the second power supply can be reduced, and the stand-by power of the main unit in stand-by status can be thus reduced substantially to zero. With adopting a power supply other than the commercial AC power source such as a solar battery for the second power supply, the power consumption for stand-by status from the commercial AC power source can be reduced to zero.

According to a second invention, in a power supply circuit for an electric device having a main power supply circuit and a stand-by power supply circuit in the main unit of said electric device which can control turning on and off of said main power supply circuit according to the key operation on the remote controller, said remote controller comprises operation keys; a first transmitting means for generating an electromagnetic wave and transmitting it to said main unit; a second transmitting means for generating a first remote control signal containing a first signal to turn on said main power supply circuit and transmits it to the main unit; a first receiving means for receiving a second remote control signal indicating the rise-up completion of said main power supply circuit transmitted from the main unit; and a first control means for providing instruction for the emission of said electromagnetic wave corresponding to the operation of a certain key among said operation keys and providing instruction for the transmission of said first signal after the emission of said electromagnetic wave, and further for stopping the generation of said electromagnetic wave when the receiving of said second remote control signal is detected; and said main unit comprises a main power supply circuit for supplying the power to a first load circuit required for ordinary operation during ordinary operation based on the commercial AC power source; a second receiving means to receive the first remote control signal from said remote controller; second control means to which the first remote control signal received by said second receiving means is supplied and which controls the main unit in response to the remote control signal; a first power supply for receiving the electromagnetic wave from said remote controller, converting the received electromagnetic wave to the electric energy and generating the DC voltage; a second power supply serving as a stand-by power supply circuit for supplying the power to a second load circuit (including at least said second control means and said second receiving means) required for stand-by operation during stand-by status; a first switching means provided between said second power supply and said second load circuit to turn on and off the connection between said second power supply and said second load circuit corresponding to whether or not the DC voltage is received from said first power supply; a second switching means for turning on and off the power supply from said commercial AC power source to said main power supply circuit which, under the control by said second control means, makes switch operations corresponding to said first remote control signal received by said second receiving means; and a third transmitting means for detecting the rise-up completion of said main power supply circuit and, under the control by said second control means, transmitting said second remote control signal to said remote controller.

In the second invention, in addition to the same operation and effect as the first invention, the rise-up completion of the main power supply circuit is detected and the second remote control signal indicating the main power supply circuit rise-up completion is transmitted to the remote controller. With receiving this signal, the remote controller can automatically stop electromagnetic wave emission. This prevents unnecessary emission of electromagnetic wave.

Further, with means to measure the elapse of time after the start of the electromagnetic wave emission, it can be judged that any failure occurs in the remote controller or the main unit if the second remote control signal is not transmitted from the main unit within the predetermined period of time after the electromagnetic wave emission. In such case, the electromagnetic wave emission can be stopped.

According to a third invention, in a power supply circuit for an electric device having a main power supply circuit and a stand-by power supply circuit in the main unit of said electric device which can control turning on and off of said main power supply circuit according to the key operation on the remote controller, said remote controller comprises operation keys; means for generating an electromagnetic wave and transmitting it to said main unit; means for generating a remote control signal containing a first signal to turn on said main power supply circuit and transmitting it to the main unit; and a first control means for providing instruction for the emission of said electromagnetic wave corresponding to the operation of a certain key among said operation keys and providing instruction for the transmission of said first signal after the emission of said electromagnetic wave; and said main unit comprises a main power supply circuit for supplying the power to a first load circuit required for ordinary operation during ordinary operation based on the commercial AC power source; receiving means for receiving the remote control signal from said remote controller; a second control means to which the remote control signal received by said receiving means is supplied and which controls the main unit in response to the remote control signal; a first power supply for receiving the electromagnetic wave from said remote controller, converting the received electromagnetic wave to the electric energy and generating the DC voltage; a stand-by power supply circuit for supplying the power to a second load circuit (including at least said second control means and said receiving means) required for stand-by operation during stand-by status based on said commercial AC power source; a first switching means to turn on and off the power supply from said commercial AC power source to said stand-by power supply circuit for connecting said commercial AC power source to said stand-by power supply circuit when DC voltage is generated by said first power supply; and a second switching means to turn on and off the power supply from said commercial AC power source to said main power supply circuit which, under the control by said second control means, makes switch operations corresponding to the remote control signal received by said receiving means.

In the third invention, when a certain key (e.g., the power key) on the remote controller is pressed, the electromagnetic wave is sent from the remote controller to the main unit and the first switching means is turned on. Upon turning on of the first switching means by the certain key operation, the commercial AC power source is connected to the stand-by power supply circuit driven by the AC power and the power is supplied from the stand-by power supply circuit to the second load circuit required for stand-by operation (the second control means and the receiving means in the main unit). After that, corresponding to the first signal transmitted from the remote controller, the second switching means is turned on so that the power is supplied from the commercial AC power source to the main power supply circuit in the main unit and the first load circuit for the ordinary operation (the second control means and the receiving means in the main unit and main circuits in the main unit) start operation. Corresponding to the power key operation, the main unit proceeds to the ordinary operation after quite a short period of stand-by status. By supplying the power required for stand-by operation to the second load circuit required for stand-by operation only during such period until proceeding to the ordinary operation, the power supply (or the power consumption) at the stand-by power supply circuit driven by the AC power source can be reduced, and the stand-by power of the main unit in stand-by status can be thus reduced substantially to zero.

DETAILED DESCRIPTION OF THE PREFERRED EMBODIMENTS

Referring to the accompanying figures, preferred embodiments of the present invention will be described below.

Figure 1:
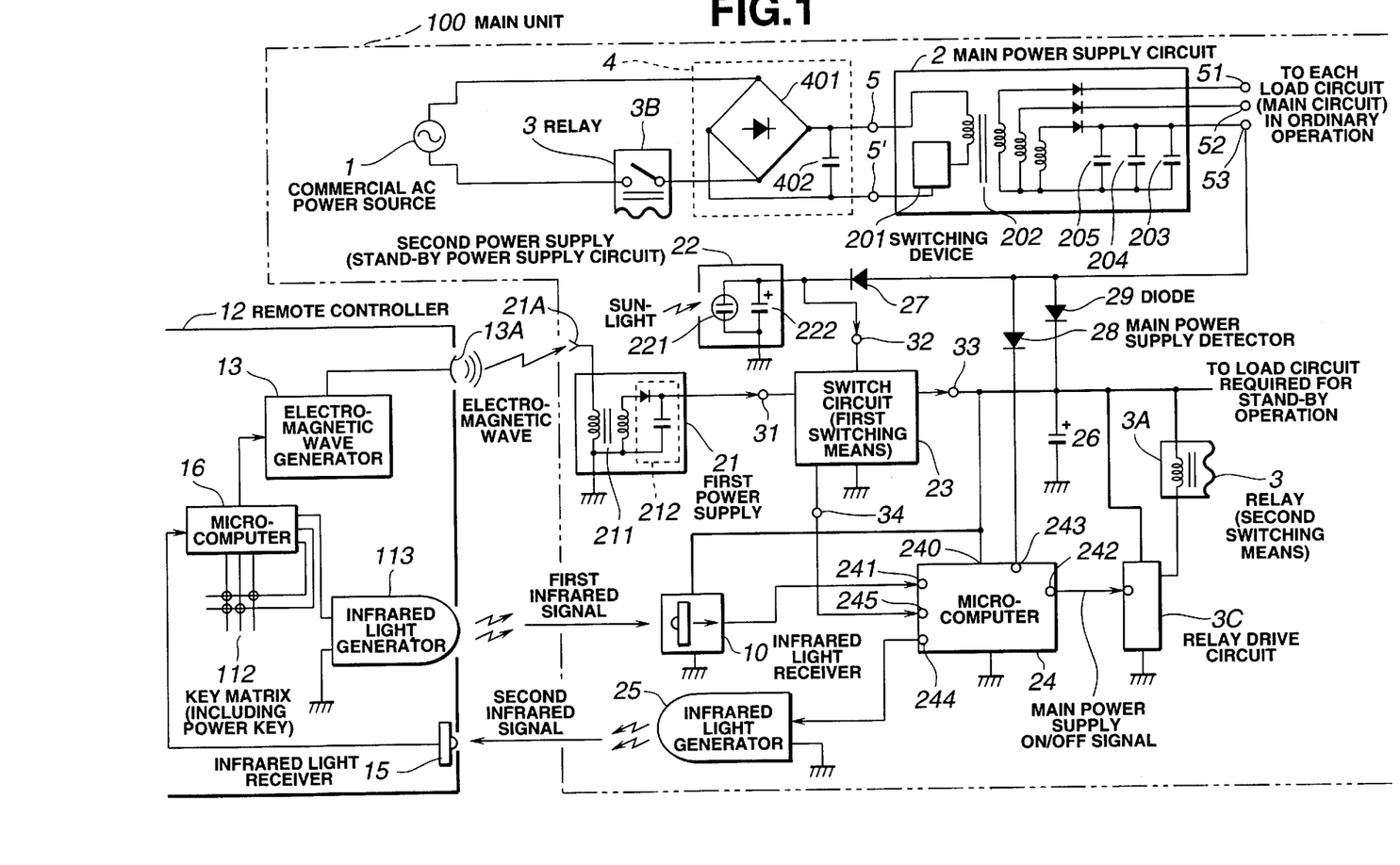
FIG. 1 is a circuit block diagram showing a power supply circuit of the electric device according to a first embodiment of the present invention.

FIG. 1 is a block diagram showing a power supply circuit of the electric device according to a first embodiment of the present invention.

In FIG. 1, commercial AC power source 1, a main power supply circuit 2, a relay 3, a rectifier smoothing circuit 4 for the main power supply, input terminals 5 and 5' of the main power supply circuit, an infrared light receiver 10, a key matrix (including a power key) 112 and an infrared light generator 113 are configuration elements having the same function as those in the conventional example and have the same numerals as they have in FIG. 6.

The power supply circuit of the electric device in FIG. 1 consists of a remote controller 12 and a power supply circuit of a main unit 100.

The remote controller 12 has an electromagnetic wave generator 13 to generate an electromagnetic wave (radio wave) and an antenna 13A for its transmission, the key matrix 112 including a power key, the infrared light generator 113 to generate the first infrared signal to turn on the main power supply circuit 2, an infrared light receiver 15 to receive the second infrared signal indicating the rise-up completion of the main power supply circuit transmitted from the main unit 100 after the rise-up of the main power supply circuit 2 in the main unit 100 and a microcomputer 16 as the first control means. The microcomputer 16 comprises, at least, a CPU, a ROM, a RAM and a clock counter and, can instruct the transmission of the electromagnetic wave, instruct transmission of the first infrared signal, detect the second infrared signal receiving, instruct stop of electromagnetic wave generation and count the elapse of time after the transmission of the electromagnetic wave based on the operation of a certain key (e.g., the power key). It can also generate the code signals corresponding to the keys according to the operation of various keys and can send the signals to the infrared light generator 113. Note that, though the infrared signal is used as the signal for remote control in the present invention, any light other than the infrared light can be used as the remote control signal.

The main unit 100 has the commercial AC power source 1, the main power supply circuit 2 to supply the power to the first load circuit (including main circuit) in ordinary operation, the relay 3 (comprising a drive winding 3A, a switch 3B and a relay drive circuit 3C) to turn on and off the operation of the main power supply circuit 2, and the rectifier smoothing circuit 4 for the main power supply. The main unit 100 is further provided with a first power supply 21 which receives the electromagnetic wave from the remote controller 12 and generates the DC voltage, a second power supply 22 serving as the stand-by power supply circuit to supply the power to the second load circuit including a microcomputer 24 and the light receiver 10 during stand-by operation after the operation of the power key until proceeding to the ordinary operation, and a switch circuit 23 as a first switching means to turn on and off the connection between the above second power supply 22 and the above second load circuit. It further comprises an infrared light generator 25 which transmits the second infrared signal indicating the rise-up completion of the main power supply to the remote controller 12 when the above main power supply circuit 2 is activated, a charging diode 27 to charge the capacitor 222 of the second power supply 22, a main power supply detector diode 28 to detect the rise-up of the output voltage from the main power supply circuit 2 and a backup diode 29 to continuously supply the power to the second load circuit after the rise-up of the main power supply circuit 2. The microcomputer 24 serving as the second control means is provided at least with a CPU, a ROM, a RAM and a clock counter and can detect the first infrared signal, generate the main power supply ON/OFF signal, detect the signal detecting the rise-up of the main power supply circuit, instruct transmission of the second infrared signal, detect the turning on of the switch circuit 23 and count the elapse of time after turning on of the switch circuit 23.

Major elements constituting the power supply circuit of the main unit 100 are described below.

To the main power supply circuit 2, the DC voltage is supplied from the rectifier smoothing circuit 4 via the input terminals 5 and 5'. The circuit generates the regulated DC voltages of various sizes and supplies the DC voltages through output terminals 51, 52 and 53 to various load circuits (main circuit) (not shown) in the ordinary operation. The main power supply circuit 2 comprise, for example, a switching type power supply circuit provided with a switching means 201 for switching of the rectification smoothing voltage to be supplied to the primary coil of a converter transformer 202, the converter transformer 202 for voltage conversion which converts the switched AC voltage on the primary side to the voltages of various sizes and outputs them to the secondary side and several rectifier smoothing circuits 203, 204 and 205, which are respectively connected to several secondary side coils of the transformer 202. The DC voltage from the output terminal 53 is used for charging of the second power supply (stand-by power supply circuit) 22 or used as the power supply for load circuits such as the microcomputer 24 in ordinary operation.

The first power supply 21 is provided with an antenna 21A to receive the electromagnetic wave, a transformer 211 which converts the received electromagnetic wave into electric signal for output, and a rectifier smoothing circuit 212 which rectifies and smoothes the output on the secondary side of the transformer. It receives the electromagnetic wave transmitted from the electromagnetic wave generator 13 and the antenna 13A on the remote controller 12, converts it to the electric energy to generate the DC voltage and then outputs it to the control input terminal 31 of the switch circuit 23.

The second power supply 22 is a stand-by power supply circuit to supply the power required for stand-by operation to the load circuits in stand-by status and comprises, for example, a solar battery 221 and a charging capacitor 222 connected to it in parallel. Before the operation of the power key on the remote controller 12 (i.e. when the relay switch 3B is turned off and the main power supply circuit 2 is not in operation), the charging capacitor 222 can be charged by the solar battery 221. When the power key on the remote controller 12 is operated, the relay switch 3B is turned on and the main power supply circuit 2 is activated, the charging capacitor 222 can be charged from the main power supply circuit 2 via the charging diode 27. Therefore, the second power supply 22 in FIG. 1 shows the stand-by power supply configuration provided with the solar battery 221 and the main power supply circuit 2 together. By removing the charging diode 27 and eliminating the connection between the second power supply 22 and the main power supply circuit 2, the second power supply 22 can be designed to have energy sources other than commercial power supply such as the solar battery 221 with relatively small electromotive force. Alternatively, with deleting the solar battery 221, the second power supply 22 can be constituted with a charging capacitor 222 alone so as to limit the supplied power to that obtained by charging of the voltage from the main power circuit 2 through the diode 27 while the electric device is in operation.

The switch circuit 23 is a switching means provided with a control input terminal 31 to which the DC output of the first power supply 21 is input, a power supply input terminal 32 to which the DC output of the second power supply 22 is input, a power supply output terminal 33 to supply the DC output of the second power supply 22 to the load circuits required for stand-by operation and an output terminal 34 to output the signal indicating turning on of the switch. Corresponding to whether the DC voltage is output or not from the first power supply 21, the switching means connects (ON) or disconnects (OFF) the second power supply (stand-by power supply circuit) 22 and the load circuit required for stand-by operation (including the microcomputer 24 and the light receiver 10).

The main power supply detector 28 detects switching of the main unit 100 from the stand-by status to the ordinary operation status. It comprises a diode, for example, and detects the rise of the rectification smoothing voltage from the output terminal 53 of the main power supply circuit 2 to the ordinary operation status (i.e. the rectification smoothing voltage reaches the predetermined level) by the conduction of the diode and transmits the detection signal to a detection terminal 243 of the microcomputer 24 in the main unit 100.

The infrared light generator 25 generates, according to the instruction from an output terminal 244 of the microcomputer 24, the infrared code signal indicating that the main power supply completes rise-up or the main unit 100 enters the ordinary operation status so as to transmit it to the infrared light receiver 15 on the remote controller 12.

The microcomputer 24 serving as the control means has at least a CPU (Central Processing Unit), a ROM storing the program data, a RAM to store various data and a clock counter for time measurement inside. It is further provided with, as input/output terminals, a power supply input terminal 240 for the microcomputer, a first infrared signal detection terminal 241, an output terminal 242 for the main power supply ON/OFF signal, the detection terminal 243 for the main power supply rise-up detection signal, the output terminal 244 to instruct the transmission of the second infrared signal and a detection terminal 245 for the signal indicating that the switch circuit 23 is turned on. It can detect the first infrared signal, output the main power supply ON/OFF signal, detect the main power supply rise-up detection signal, instruct the transmission of the second infrared signal and count the time after turning on of the switch circuit 23.

When the infrared light receiver 10 receives the first infrared signal to turn on the main power supply from the remote controller 12, the microcomputer 24 supplies the ON signal of the main power supply ON/OFF signal to the relay drive circuit 3C. The relay drive circuit 3C supplies the drive current to the drive winding 3A on the primary side of the relay 3. Thus, the switch 3B of the relay 3 positioned between the commercial AC power source 1 and the rectifier smoothing circuit 4 for the main power supply is turned on so that the main power supply circuit 2 operates on the power from the AC power source 1.

Referring now to FIGS. 2(*a*) to (*e*), the operation in FIG. 1 is explained below.

When the user presses the power key on the remote controller 12 at time t1 as shown in FIG. 2(*a*) and the microcomputer 16 for control detects the pressing, the electromagnetic wave generator 13 emits the electromagnetic wave at time t2 as shown in FIG. 2(*b*) so that the energy is supplied to the first power supply 21 of the main unit 100, which is the receiver side. When the voltage appears at the output terminal of the first power supply 21 receiving the supply of the energy and the output voltage turns on the switch circuit 23 as shown in FIG. 2(c), the power is supplied from the second power supply 22 via the switch circuit 23 to the load circuits required for stand-by operation such as the microcomputer 24, the infrared light receiver 10 and the relay drive circuit 3C, for example, and the main unit 100 enters the stand-by status. This means that preparation for shifting to the ordinary operation status is completed.

Figures 2A, 2B:
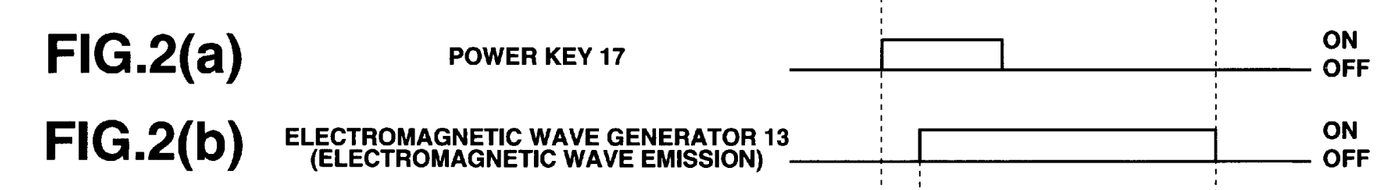
FIGS. 2(a) to (e) are time charts illustrating the operation for FIG. 1.
Figure 2C:
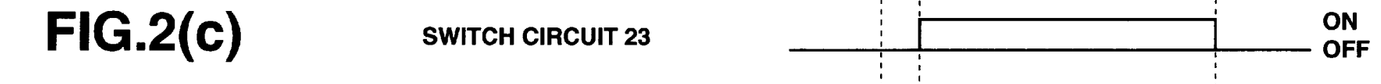
Figure 2D:
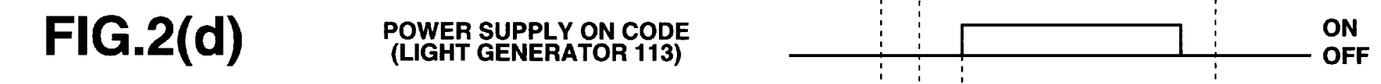
Figure 2E:
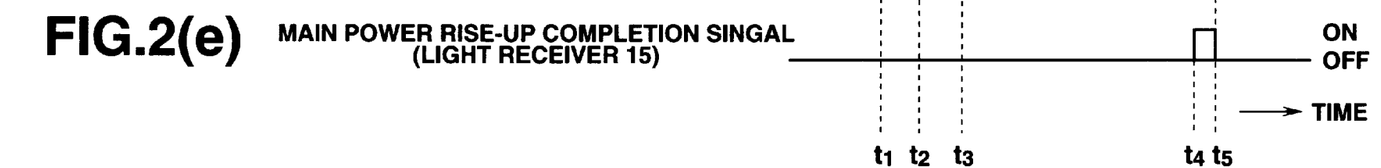

While the energy emitted from the electromagnetic wave generator 13 is supplied to the main unit 100, the remote controller 12 transmits the remote control code (Power-on code) to operate the main power supply circuit 2 as the first infrared signal from the infrared light generator 113 at time t3 as shown in FIG. 2(d). Then, the microcomputer 24 on the receiver side decodes the power-on code sent via the infrared light receiver 10 and transmits the main power supply ON signal to the relay drive circuit 3C, which causes the drive current to flow in the primary winding 3A of the relay 3. This turns on the secondary side switch 3B, which operates the main power supply circuit 2 and the main unit 100 enters the ordinary operation status. Until completion of this series of operations, the electromagnetic wave emission from the electromagnetic wave generator 13 in the remote controller 12 is continued. In other word, the switch circuit 23 is kept turned on. After that, when the main power supply detector 28 detects the rise-up completion of the main power supply circuit 2, the microcomputer 24 on the device sends the rise-up completion signal as the second infrared signal via the infrared light generator 25 to the remote controller 12 as shown in FIG. 2(e) and, when the infrared light receiver 15 of the remote controller 12 receives the completion signal at time t4, the electromagnetic wave emission from the electromagnetic wave generator 13 is stopped at time t5. Thus, the switch circuit 23 is turned off and the connection between the second power supply 22 serving as the stand-by power supply circuit and the load circuits including the microcomputer 24 is shut off (OFF), but the power is kept supplied to the load circuits via the backup diode 29 from the main power supply circuit 2.

The remote controller 12 enters the mode to wait for the next key input (stand-by mode) when the emission of the electromagnetic wave is stopped.

As described above, the embodiment as shown in FIG. 1 achieves the stand-by operation without using the commercial AC power source as the power supply source for the stand-by power supply circuit as in conventional devices.

Further, the switch circuit 23 and the electromagnetic wave generator 13 are in operation only for the period from the pressing of the power key on the remote controller 12 to the rise-up of the main power supply circuit 2, the second power supply 22 and the electromagnetic wave generator 13 consume the power only a little. In addition, by using an energy source with a relatively low electromotive force, such as a solar battery, as the second power supply 22, the energy can be saved more.

The present invention uses two different transmission operation modes: the operation of the switch circuit 23 by electromagnetic wave transmission and the transmission of infrared power-on code to activate the main power supply circuit 2 (These two modes are different in the wavelength of the transmission media and in the use of the power-on code signal). Since these two transmission modes are independent, even when the switch circuit 23 is operated by electromagnetic wave from other device, for example, the main power supply circuit 2 does not operate as far as no power-on code is sent. This configuration is advantageous in that it can prevent erroneous operation due to other electromagnetic wave.

Then, referring to FIGS. 3(a) to (c) and (e), the operation in the event of any failure in the power supply circuit of FIG. 1 will be described.

Figure 3A:
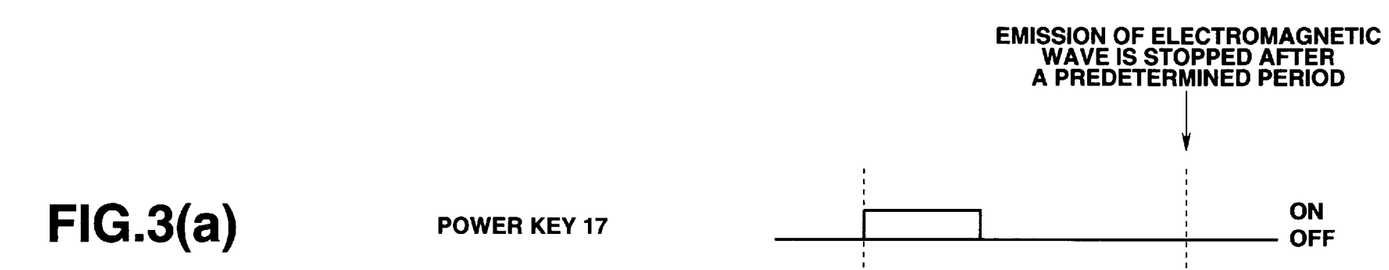
FIGS. 3(a) to (c) and (e) are time charts illustrating the operation when any failure occurs in the power supply circuit of FIG. 1.
Figure 3B:
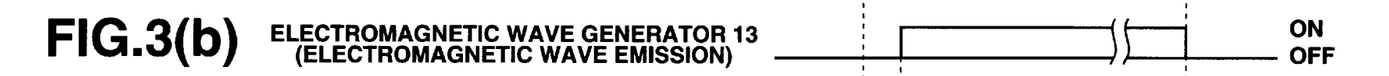
Figure 3C:
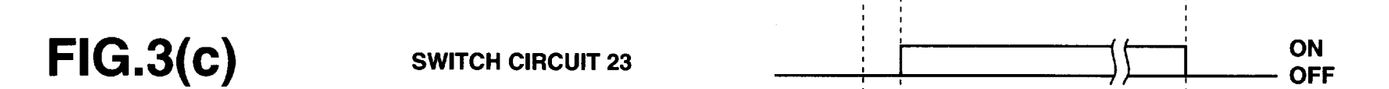
Figure 3E:
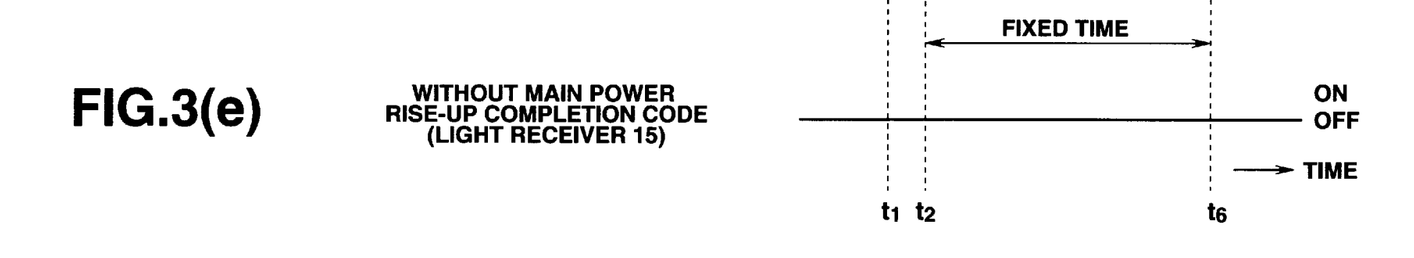

When the power key is pressed at time t1 as shown in FIG. 3(a), the remote controller 12 transmits the electromagnetic wave at time t2 as shown in FIG. 3(b) and the switch circuit 23 is turned on once as shown in FIG. 3(c). If the second infrared signal (main power supply rise-up signal) is not input from the infrared light generator 25 of the main unit 100 to the infrared light receiver 15 in the remote controller 12 within the predetermined period of time as in FIG. 3(e), the microcomputer 16 in the remote controller 12, at time t6, instructs the electromagnetic wave generator 13 to stop the electromagnetic wave generation and stops emission of the electromagnetic wave.

This operation is advantageous for preventing unnecessary electromagnetic wave emission from the remote controller 12 in the event of any failure on the main unit or any failure of the infrared light generator 14 on the remote controller 12 (i.e. in the event of power-on code transmission failure).

If, after the switch circuit 23 is turned on and such turning on is detected, the main power supply rise-up completion signal is not received from the main power supply detector 28 within the predetermined period of time, the microcomputer 24 of the main unit 100 sends the main power supply OFF signal to the relay drive circuit 3C to turn off the relay 3 so as to stop the operation of the main power supply circuit 2 of the main unit 100. Thus, the relay 3 is turned off in case the switch circuit 23 is turned on after receiving of the electromagnetic wave and the relay 3 of the main unit 100 is turned on according to the infrared power-on code from the light generator 113, but the main power supply rise-up completion signal is not input to the microcomputer 24 within the predetermined period of time. This further improves the safety of the power supply circuit with the stop of the electromagnetic wave emission on the remote controller 12 as described in FIGS. 3(a) to (c) and (e).

Figure 4:
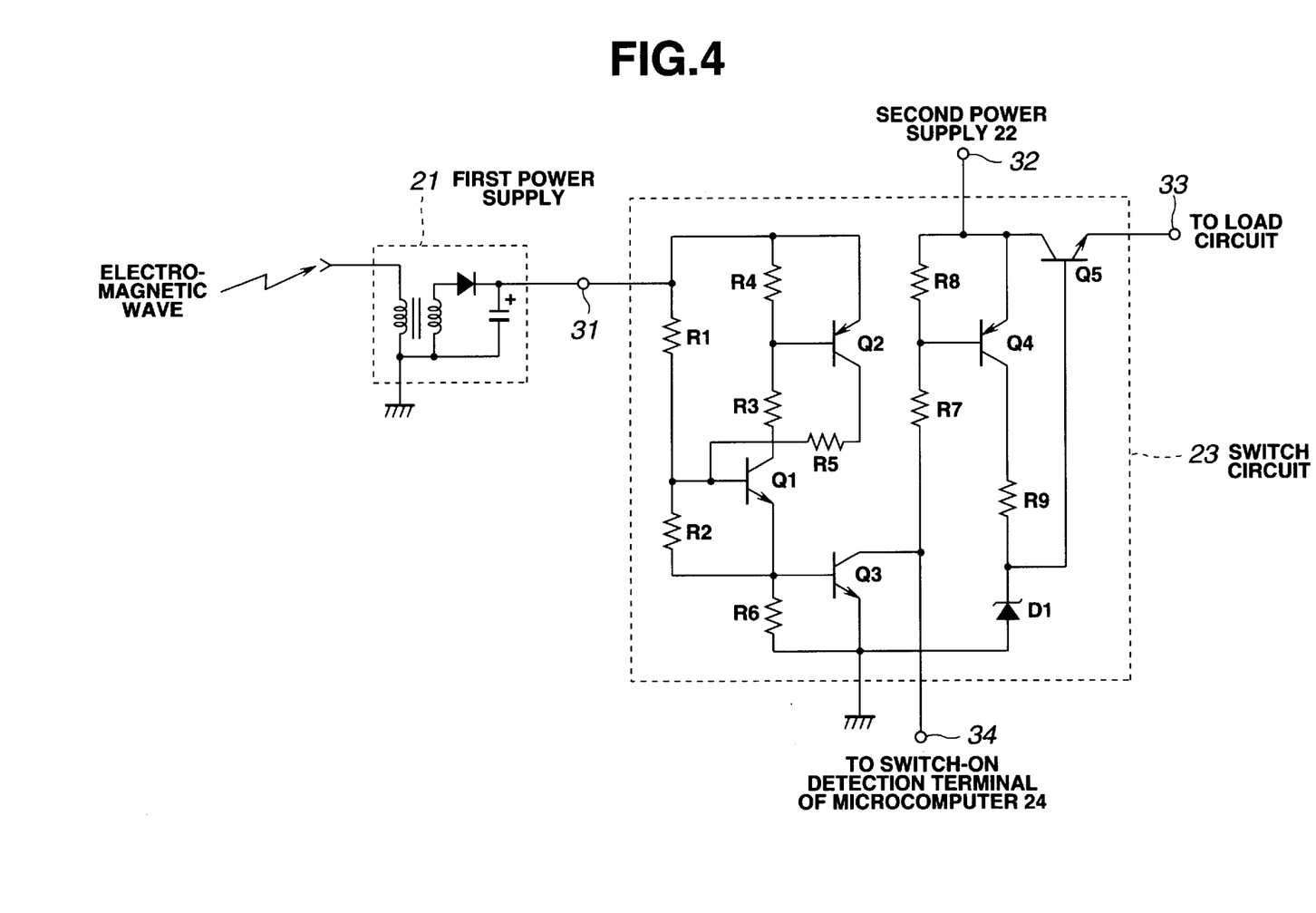
FIG. 4 is a circuit diagram showing an embodiment of the specific configuration for the switch circuit in FIG. 1.

FIG. 4 is a circuit diagram showing an embodiment of the specific configuration for the switch circuit 23 in FIG. 1.

The switch circuit 23 as shown in FIG. 4 comprises NPN transistors Q1, Q3 and Q5, PNP transistors Q2 and Q4, a Zener diode D1 forming the reference voltage for the output of the switch circuit 23 and resistors R1 to R9.

The output voltage of the first power supply 21 is input to the control input terminal 31 of the switch circuit 23. The control input terminal 31 is, via the resistor R1, connected to the base of Q1. The collector of Q1 is, via the resistor R3, connected to the base of Q2 and the emitter of Q1 is connected to the base of Q3. The emitter of Q2 is connected to the control input terminal 31 and the collector of Q2 is, via the resistor R5, connected to the base of Q1. Further, the collector of Q3 is, via the resistor R7, connected to the base of Q4 and the emitter of Q3 is connected to the reference potential point. The emitter of Q4 is connected to the power supply input terminal 32 for input of the output voltage from the second power supply 22 and the collector of Q4 is, via a series circuit of the resistor R9 and the Zener diode D1, connected to the reference potential point. In addition, to the connection point of R9 and D1 above, the base of QS is connected. The collector of Q5 is connected to the power supply input terminal 32 above and the emitter of Q5 is connected to the power supply output terminal 33 for connection with the load circuits required for stand-by operation. For Q1, Q2, Q3 and Q4, the resistors R2, R4, R6 and R8 are connected in parallel with their base and emitter respectively.

The operation of the switch circuit 23 is described below.

The electromagnetic wave sent from the remote controller 12 is received, rectified and smoothed at the first power supply 21 and input to the control input terminal 31 of the switch circuit 23. When the potential of the control input terminal 31 rises, Q1 is turned on and causes the base current to flow to Q2 via R3, and Q2 is turned on. When Q2 is turned on, the base current is supplied to Q1 via R5 and both Q1 and Q2 reach the saturation status. Q1 and Q2 are in thyristor connection and are not turned off unless the potential at the control input terminal 31 becomes lower than the holding current for thyristor connection.

When Q1 and Q2 are turned on, the current flows to the base of Q3, and Q3 is also turned on. Upon turning on of Q3, the current flows to the base of Q4 via R7 and Q4 is turned on. Thus, the current is supplied from the second power supply 22 to the base of Q5 via R9 and Q5 is turned on. The second power supply 22 is connected to the power supply output terminal 33 via Q5 and the power is supplied to the load circuits required for stand-by operation. When, on the contrary, the potential at the control input terminal 31 becomes lower and the base current at Q1 and Q2 becomes lower than the holding current, Q1 and Q2 are turned off and Q3 and Q4 are also turned off. With the base current for Q5 shut off, Q5 is turned off and the connection between the second power supply 22 and the output terminal 33 for connection with the load circuits is shut off.

To the terminal 34 connected to the collector of Q3, the low level signal (reference potential level) is output when Q3 is on, i.e. the switch circuit 23 is on and the high level signal by the second power supply 22 is output when Q3 is off, i.e. the switch circuit 23 is off. Thus, the microcomputer 24 can detect that the switch circuit 23 is turned on by the output level Now level) of Q3 turned on.

Figure 5:
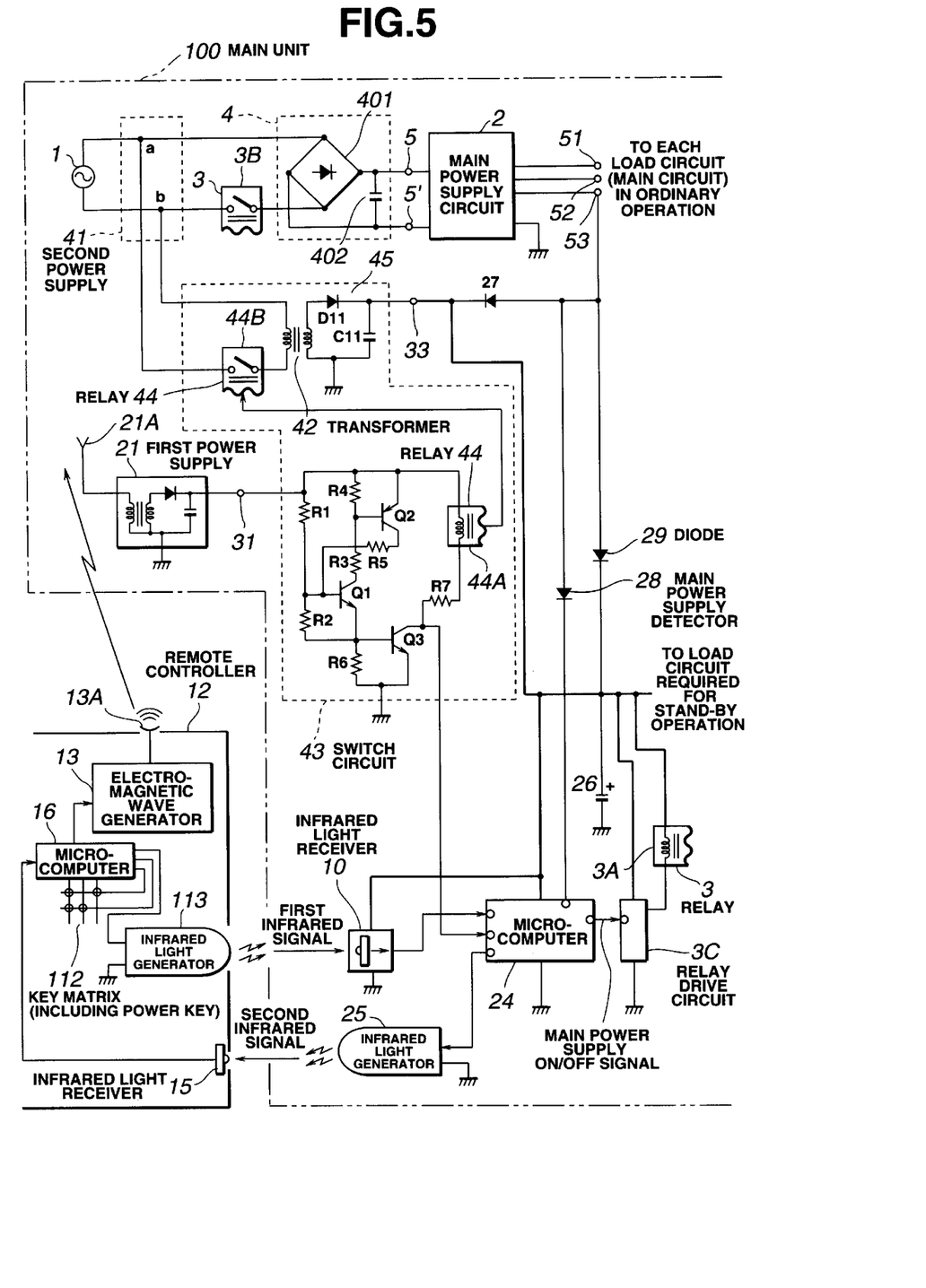
FIG. 5 is a circuit block diagram showing a power supply circuit of the electric device according to a second embodiment of the present invention.

FIG. 5 is a schematic diagram showing a power supply circuit according to a second embodiment of the present invention. In FIG. 5, the sections corresponding to the second power supply 22 and the switch circuit 23 in FIG. 1 are different from those in FIG. 1. These sections are represented as a second power supply 41 and a switch circuit 43.

In the circuit configuration of FIG. 5, commercial AC power source 1, a main power supply circuit 2, a relay 3, a rectifier smoothing circuit 4, a first power supply 21, a decoupling capacitor 26, a charging diode 27, a backup diode 29, a main power detector 28, a microcomputer 24 for control, an infrared light receiver 10 and an infrared light generator 25 are the same as those in FIG. 1 and a remote controller 12 has the same configuration as the one in FIG. 1. Explanation about them are omitted here.

The second power supply 41 in FIG. 5 is fed by the commercial AC power source 1. The switch circuit 43 comprises NPN transistors Q1 and Q3 and a PNP transistor Q2, resistors R1 to R7, a relay 44, a rectifier smoothing circuit 45 having a diode D11 and a capacitor C11, and a converter transformer 42 for voltage conversion.

The output voltage from the first power supply 21 is input to the control input terminal 31 of the switch circuit 43. The control input terminal 31 is via the resistor R1 connected to the base of Q1 and the collector of Q1 is via the resistor R3 connected to the base of Q2 and the emitter of Q1 is connected to the base of Q3. Connected across the base and emitter of Q1 is the resistor R2. The emitter of Q2 is connected to the control input terminal 31 and the collector of Q2 is via the resistor R5 connected to the base of Q1. Further, the collector of Q3 is via the resistor R7 connected to an end of a primary side winding 44A of the relay 44 and the other end of the winding 44A is connected to the control input terminal 31. The emitter of Q3 is connected to the reference potential point. In addition, an end of a mechanical switch 44B on the secondary side of the relay 44 is connected to an end "a" of the second power supply 41 and the other end of the switch is, via the primary side winding of the transformer 42, connected to the other end "b" of the second power supply 41. The secondary side winding of the transformer 42 is connected to the rectifier smoothing circuit 45 consisting of the diode D11 and the capacitor C11 and the power supply output terminal 33 of the switch circuit 43 is connected to the load circuits (such as the microcomputer 24 and the light receiver 10) required for stand-by operation.

The operation in FIG. 5 is described below.

The second embodiment is characterized by supply of the second power from the commercial AC power source 1. When the first power supply 21 receives the electromagnetic wave emitted according to the power key operation on the remote controller 12, the output from the first power supply 21 raises the potential at the input terminal 31 of the switch circuit 43 and turns on Q1 and Q2, and causes Q3 to be turned on so that the electric current flows through the drive winding 44A on the primary side of the relay 44 and the mechanical switch 44B on the secondary side is turned on. Thus, the voltage of the commercial AC power source 1 is input to the primary side of the converter transformer 42 and the AC voltage of appropriately converted size is generated on the secondary side. By rectifying and smoothing such voltage at the rectifier smoothing circuit 45, the rectified and smoothed voltage can be obtained at the power supply output terminal 33. Therefore, the DC voltage according to the second power supply 41 is, via the switch circuit 43, supplied to the load circuits required for stand-by operation. The subsequent operations are the same as those described referring to FIGS. 2(a) to (e).

In the embodiment of FIG. 5, the commercial AC power source 1 is used as the second power supply (stand-by power supply circuit), but the processes starting from pressing of the power key on the remote controller 12 where the power supply circuit receives the electromagnetic wave and starts stand-by operation and then automatically enters to the ordinary operation status upon subsequent receipt of the infrared code are the same as those in the embodiment shown in FIG. 1. The period in which the electric device remains in stand-by status is quite shorter than that in case of the conventional device and the power consumption in stand-by status can be saved largely.

According to the embodiment of the present invention, when the power key, which is a certain key on the remote controller 12 is pressed, the switch circuit 23 or 43 as the first switching means is turned on and, corresponding to such turning on, the second power supply 22 or 41 as the stand-by power supply circuit starts operation so that the power is supplied to the load circuits including the microcomputer 24 and the light receiver 26 required for stand-by operation. Since the power is supplied from the stand-by power supply circuit to the load circuits including the microcomputer 24 and the light receiver 26 for quite a short period from the start of the stand-by status after the power key operation to the ordinary operation, the power supply for the second power supply 22 or 41 can be reduced. If the solar battery is used as the second power supply, the stand-by power for the device in stand-by status can be reduced to zero.

As described above, since the main unit goes to the stand-by status and then to the ordinary operation status only when the electric device is used, the stand-by power supply circuit is used only during a short period before the ordinary operation status and the power consumption of the stand-by power supply circuit can be saved. In addition, by adopting an energy saving type power supply other than the commercial AC power source such as a solar battery, the power at the electric device in stand-by status can be reduced to zero.

It will be understood that the present invention is not limited to the embodiments described above and can be modified in various ways without departing from the scope and spirit of the invention.

What is claimed is:

1. A power supply circuit for an electric device having a main power supply circuit and a stand-by power supply circuit in the main unit of said electric device which can control turning on and off of said main power supply circuit according to the key operation on the remote controller, wherein said remote controller comprises:
operation keys;
means for generating an electromagnetic wave and transmitting it to said main unit;
means for generating a remote control signal containing a first signal to turn on said main power supply circuit and transmitting it to the main unit; and
first control means for providing instruction for the emission of said electromagnetic wave corresponding to the operation of a certain key among said operation keys and providing instruction for the transmission of said first signal after the emission of said electromagnetic wave; and wherein said main unit comprises:
a main power supply circuit for supplying the power to a first load circuit required for ordinary operation during ordinary operation based on the commercial AC power source;
receiving means for receiving said remote control signal from said remote controller;
second control means to which the remote control signal received by said receiving means is supplied and which controls the main unit in response to the remote control signal;
a first power supply for receiving the electromagnetic wave from said remote controller, converting the received electromagnetic wave to the electric energy and generating the DC voltage;
a second power supply serving as a stand-by power supply circuit for supplying the power to a second load circuit (including at least said second control means and said receiving means) required for stand-by operation during stand-by status;
first switching means provided between said second power supply and said second load circuit to turn on and off the connection between said second power supply and said second load circuit corresponding to whether or not the DC voltage is received from said first power supply; and
second switching means for turning on and off the power supply from said commercial AC power source to said main power supply circuit which, under the control by said second control means, makes switch operations corresponding to the remote control signal received by said receiving means.

2. A power supply circuit for an electric device having a main power supply circuit and a stand-by power supply circuit in the main unit of said electric device which can control turning on and off of said main power supply circuit according to the key operation on the remote controller, wherein said remote controller comprises:
operation keys;
first transmitting means for generating an electromagnetic wave and transmitting it to said main unit;
second transmitting means for generating a first remote control signal containing a first signal to turn on said main power supply circuit and transmits it to the main unit;
first receiving means for receiving a second remote control signal indicating the rise-up completion of said main power supply circuit transmitted from the main unit; and
first control means for providing instruction for the emission of said electromagnetic wave corresponding to the operation of a certain key among said operation keys and providing instruction for the transmission of said first signal after the emission of said electromagnetic wave, and further for stopping the generation of said electromagnetic wave when the receiving of said second remote control signal is detected; and wherein said main unit comprises:
a main power supply circuit for supplying the power to a first load circuit required for ordinary operation during ordinary operation based on the commercial AC power source;
second receiving means to receive the first remote control signal from said remote controller;
second control means to which the first remote control signal received by said second receiving means is supplied and which controls the main unit in response to the remote control signal;
a first power supply for receiving the electromagnetic wave from said remote controller, converting the received electromagnetic wave to the electric energy and generating the DC voltage;
a second power supply serving as a stand-by power supply circuit for supplying the power to a second load circuit (including at least said second control means and said second receiving means) required for stand-by operation during stand-by status;
first switching means provided between said second power supply and said second load circuit to turn on and off the connection between said second power supply and said second load circuit corresponding to whether or not the DC voltage is received from said first power supply;
second switching means for turning on and off the power supply from said commercial AC power source to said main power supply circuit which, under the control by said second control means, makes switch operations corresponding to said first remote control signal received by said second receiving means; and
third transmitting means for detecting the rise-up completion of said main power supply circuit and, under the control by said second control means, transmitting said second remote control signal to said remote controller.

3. A power supply circuit for an electric device according to claim 1 or 2, wherein a certain key of said remote controller is a power key and said first power supply turns on said first switching means corresponding to the DC voltage caused by said electromagnetic wave only when said power key is operated so that said stand-by power supply circuit and said second load circuit are connected.

4. A power supply circuit for an electric device according to claim 2, wherein said first control means further comprises means to count the elapse of time after the emission of said electromagnetic wave, and the emission of said electromagnetic wave is stopped when said second remote control signal is not sent from the main unit within a predetermined period of time after the emission of the electromagnetic wave from said remote controller.

5. A power supply circuit for an electric device according to claim 1 or 2, wherein the power fed by a solar battery or the power stored while said main power supply circuit is in operation in the main unit is used as said stand-by power supply circuit.

6. A power supply circuit for an electric device according to claim 1 or 2, wherein said second control means in the main unit receives the power supplied from the main power supply circuit after the rise-up of said main power supply circuit.

7. A power supply circuit for an electric device having a main power supply circuit and a stand-by power supply circuit in the main unit of said electric device which can control turning on and off of said main power supply circuit according to the key operation on the remote controller, wherein said remote controller comprises:
   operation keys;
   means for generating an electromagnetic wave and transmitting it to said main unit;
   means for generating a remote control signal containing a first signal to turn on said main power supply circuit and transmitting it to the main unit; and
   first control means for providing instruction for the emission of said electromagnetic wave corresponding to the operation of a certain key among said operation keys and providing instruction for the transmission of said first signal after the emission of said electromagnetic wave; and
said main unit comprises:
   a main power supply circuit for supplying the power to a first load circuit required for ordinary operation during ordinary operation based on the commercial AC power source;
   receiving means for receiving the remote control signal from said remote controller;
   second control means to which the remote control signal received by said receiving means is supplied and which controls the main unit in response to the remote control signal;
   a first power supply for receiving the electromagnetic wave from said remote controller, converting the received electromagnetic wave to the electric energy and generating the DC voltage;
   a stand-by power supply circuit for supplying the power to a second load circuit (including at least said second control means and said receiving means) required for stand-by operation during stand-by status based on said commercial AC power source;
   first switching means to turn on and off the power supply from said commercial AC power source to said stand-by power supply circuit for connecting said commercial AC power source to said stand-by power supply circuit when DC voltage is generated by said first power supply; and
   second switching means to turn on and off the power supply from said commercial AC power source to said main power supply circuit which, under the control by said second control means, makes switch operations corresponding to the remote control signal received by said receiving means.

* * * * *